O. Du BOIS.
Track-Clearers for Harvesters.
No. 137,351.   Patented April 1, 1873.
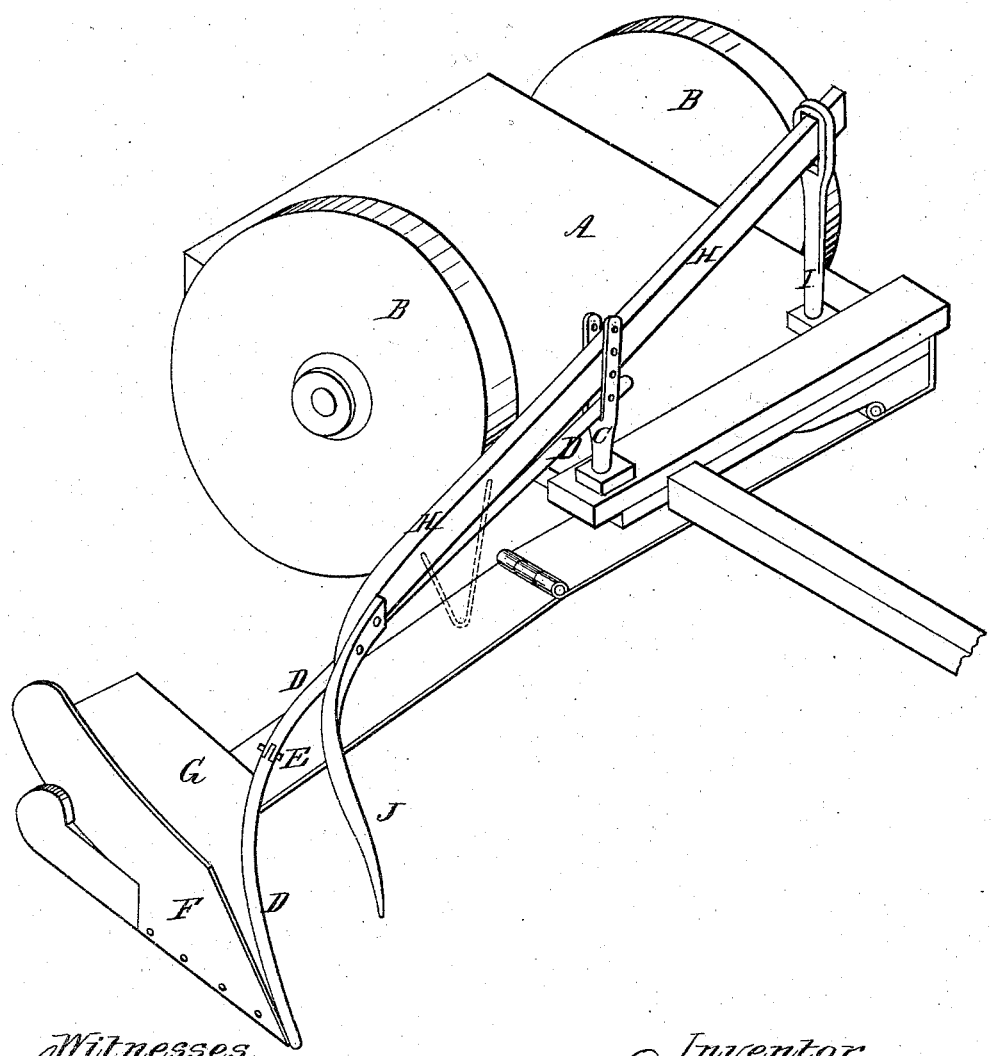
Witnesses.
P. L. Boone
C. M. Richardson
Inventor:
Orin Du Bois
per Dewey & Co.
attys.

UNITED STATES PATENT OFFICE.

ORIN DU BOIS, OF SAN JOSÉ, CALIFORNIA.

IMPROVEMENT IN TRACK-CLEARERS FOR HARVESTERS.

Specification forming part of Letters Patent No. 137,351, dated April 1, 1873; application filed August 3, 1872.

*To all whom it may concern:*

Be it known that I, ORIN DU BOIS, of San José, Santa Clara county, State of California, have invented an Attachment for Mowing-Machines; and I do hereby declare the following description and accompanying drawing are sufficient to enable any person skilled in the art or science to which it most nearly appertains to make and use my said invention without further invention or experiment.

The object of my invention is to provide a novel attachment for mowing-machines and other similar machines; and it consists mainly in the employment of a rod or bar, which extends diagonally over the cutters, and, by its peculiar position, causes the cut grass or grain to fall away from the standing grass or grain and lie at an angle. It further consists in the use of an additional device at the end of the cutter-bar, by which this object is more fully accomplished.

Referring to the accompanying drawing for a more complete explanation of my invention, Figure 1 is a perspective view.

A is the body of a mowing-machine mounted upon wheels B B. C is a standard, which is secured upon the platform of the machine, and through this the end of the bar D passes so as to move back and forward by the irregular movements of the outer end of the cutter-bar. This movement is facilitated by jointing the bar, as shown at E. The outer end of the bar D stands forward, while the inner end is back of the line of the knives. At the outer end of the cutter-bar, and secured to the shoe, is a curved metal plate, F, the front edge of which is inclined, as shown, and is made sharp, as will be hereafter described. A sort of housing, G, is secured to this plate, and projects a short distance over the end of the cutter-bar, following the line of the bar D where it curves down to the shoe.

The operation will be as follows: The point of the shoe and the bar D will enter between the standing grain or grass and separate off that portion which is to be cut, while the angle of the bar D inclines it away from the division-line, so that, when the knives cut it, it will fall behind the knives and lie at an angle, with the heads away from the standing grain and the butt ends toward it.

By this device the grass or grain is laid regularly, so that it might be raked and bound, if desired.

The cut grass or grain being laid clearly away from the standing grass or grain, the machine, when it comes around again, will not cut off the heads of the previous swath or be clogged by them, and the quality of it is thereby improved.

By means of the plate F and housing G any grass which is much inclined, so as to pass under the bar D, will also be turned away from the standing grass, and the division-line will also be more completely made.

The front edge of the plate F, being sharp, will cut any vines, burr, clover, or tangled grass, which would otherwise clog the machine, and for this purpose must be made long enough to cut it before the inner ends are cut by the knives. In some cases a single bar, H, may be employed, being supported by two standards, C and I, upon the machine, and having a projecting point, J, as shown; or the two devices may be employed together.

When there is a strong wind blowing across the line of travel it is sometimes found beneficial to introduce rods or wires along the bar H, and standing at a similar angle with the point J, to assist in keeping the grass up and cause it to fall, as desired. By this means I am enabled to run the machine with a very great saving in labor, and also in power, as, by the peculiar bending forward of the grass, and especially mustard-stalks, the cut is made much easier, and there is no liability to clog by lodged grass.

Having thus described my invention, what I claim, and desire to secure by Letters Patent, is—

1. The bar or rod D, standing at an angle with the cutters of a mowing or reaping machine, substantially as and for the purpose above described.

2. The sharp-edged dividing or separating plate F, with its housing G, in combination with the rod D, substantially as and for the purpose above described.

In witness whereof I hereunto set my hand and seal.

ORIN DU BOIS. [L. S.]

Witnesses:
    J. L. BOONE,
    C. M. RICHARDSON.